(12) United States Patent
Reiter et al.

(10) Patent No.: US 8,540,262 B2
(45) Date of Patent: Sep. 24, 2013

(54) COMMERCIAL VEHICLE AND DEVICE FOR ATTACHING A SPRING ELEMENT TO A COMMERCIAL VEHICLE AXLE

(75) Inventors: Thomas Reiter, Eching (DE); Bernhard Simon, Erding (DE)

(73) Assignee: MAN Truck & Bus AG, Munich (DE)

( * ) Notice: Subject to any disclaimer, the term of this patent is extended or adjusted under 35 U.S.C. 154(b) by 239 days.

(21) Appl. No.: 13/033,987

(22) Filed: Feb. 24, 2011

(65) Prior Publication Data

US 2011/0204589 A1 Aug. 25, 2011

(30) Foreign Application Priority Data

Feb. 25, 2010 (DE) .......................... 10 2010 009 304

(51) Int. Cl.
*B60G 9/02* (2006.01)
(52) U.S. Cl.
USPC ........... 280/124.156; 280/124.11; 280/124.17
(58) Field of Classification Search
USPC .......... 280/124.11, 124.17, 124.175, 124.156
See application file for complete search history.

(56) References Cited

U.S. PATENT DOCUMENTS

| | | | | | |
|---|---|---|---|---|---|
| 3,333,866 | A | * | 8/1967 | Cuskie | .................. 280/124.116 |
| 4,733,744 | A | | 3/1988 | Glaze | |
| 4,902,035 | A | | 2/1990 | Raidel | |
| 6,406,008 | B1 | * | 6/2002 | Dudding et al. | ................. 267/52 |
| 6,406,044 | B1 | | 6/2002 | Wisotzky | |
| 7,066,479 | B2 | * | 6/2006 | Melton | ..................... 280/124.11 |
| 7,175,190 | B2 | * | 2/2007 | Reineck | .................... 280/124.17 |
| 7,325,821 | B2 | * | 2/2008 | Myers et al. | ........... 280/124.156 |
| 8,360,454 | B2 | * | 1/2013 | Fruhmann et al. | ..... 280/124.175 |
| 2002/0063407 | A1 | | 5/2002 | Platner | |
| 2004/0041463 | A1 | | 3/2004 | Gabella et al. | |
| 2006/0267305 | A1 | * | 11/2006 | Melton | .................. 280/124.175 |
| 2007/0199763 | A1 | * | 8/2007 | Henze et al. | .................. 180/378 |
| 2007/0210549 | A1 | | 9/2007 | Westnedge | |
| 2010/0237578 | A1 | | 9/2010 | Hakoda et al. | |
| 2010/0270719 | A1 | | 10/2010 | Ranum et al. | |

FOREIGN PATENT DOCUMENTS

| | | |
|---|---|---|
| BE | 391315 A | 11/1932 |
| DE | 3728356 A1 | 3/1988 |
| DE | 29616351 U1 | 11/1996 |
| DE | 19856706 C1 | 4/2000 |
| DE | 10043802 A1 | 3/2002 |
| DE | 20207770 U1 | 8/2002 |
| DE | 10110495 A1 | 9/2002 |
| EP | 0830957 A2 | 3/1998 |
| EP | 1211107 A2 | 6/2002 |
| EP | 1362718 A2 | 11/2003 |
| EP | 1762405 A1 | 3/2007 |
| EP | 2058152 A1 | 5/2009 |
| WO | 2007004949 A1 | 1/2007 |
| WO | 2008096793 A1 | 8/2008 |

* cited by examiner

*Primary Examiner* — Paul N Dickson
*Assistant Examiner* — Nicole Verley
(74) *Attorney, Agent, or Firm* — Laurence A. Greenberg; Werner H. Stemer; Ralph E. Locher (57) ABSTRACT

A commercial vehicle has its axle housings supported on the chassis frame by way of spring elements. Each spring element is connected to a clamping yoke having two legs, of which in each case one leg rests against the front of the axle housing and the other leg rests against the rear of the axle housing, as seen in the driving direction. The legs are connected to one another by a web. Each leg is fixed and secured on a fixing projection on a longitudinal side of the axle housing, and the web is spaced apart from the upper side of the axle housing.

13 Claims, 8 Drawing Sheets

COMMERCIAL VEHICLE AND DEVICE FOR ATTACHING A SPRING ELEMENT TO A COMMERCIAL VEHICLE AXLE

CROSS-REFERENCE TO RELATED APPLICATION

This application claims the priority, under 35 U.S.C. §119, of German patent application DE 10 2010 009 304.1, filed Feb. 25, 2010; the prior application is herewith incorporated by reference in its entirety.

BACKGROUND OF THE INVENTION

FIELD OF THE INVENTION

The invention relates to a commercial vehicle having an axle housing supported on the chassis frame by way of spring elements. Each spring element is connected to a clamping yoke having two legs. One leg rests against the front of the axle housing and the other leg rests against the rear of the axle housing, as seen in the driving direction. The two legs are connected to one another by way of a web.

An axle attachment means for sprung vehicle axles is described in German published patent application DE 10110495 A1. The axle attachment means has an axle housing, which is preferably designed as a square-section tube with rounded edges. Longitudinal links or leaf springs which cross the axle housing on the upper side or underside thereof are provided. Tension rods, which extend transversely to the longitudinal links or leaf springs and to the axle housing and pull said parts apart, are furthermore provided. The tension rods extend along the side walls of the axle housing and are supported on an axle lug resting against the outside of the axle housing. In addition, the tension rods are provided with at least one bend or offset along the longitudinal extent thereof. The disadvantage is that this way of securing the spring element on the axle housing subjects the axle housing to high vertical loads in the top area.

SUMMARY OF THE INVENTION

It is accordingly an object of the invention to provide a vehicle which overcomes the above-mentioned disadvantages of the heretofore-known devices and methods of this general type and which provides for the attachment of a spring to an axle housing in which the force of the spring element is introduced into the axle housing in a more advantageous way and the structure of the axle housing is thereby relieved of load.

With the foregoing and other objects in view there is provided, in accordance with the invention, a commercial vehicle, comprising:

an axle housing supported on a chassis frame by way of spring elements, the axle housing having a front and a rear relative to a driving direction of the vehicle, a longitudinal side, and an upper side;

the axle housing having a fixing projection formed on a longitudinal side thereof;

a clamping yoke connecting each of the spring elements, the clamping yoke having two legs and a web connecting the two legs to one another, one of the legs resting against the front of the axle housing and another of the legs resting against the rear of the axle housing;

each of the two legs being fixed on and secured to a respective the fixing projection on the axle housing, and the web being spaced apart from the upper side of the axle housing.

The term "commercial vehicle," as used herein is substantially synonymous with "heavy duty vehicle" and includes transport and haulage vehicles, trucks, farm vehicles, military vehicles, and the like.

The invention comprises a clamping yoke which comprises at least two legs, which are connected to one another via at least one web, with an axle housing extending between the legs. In the installed condition, the clamping yoke spans the axle housing. In this arrangement, the spring element is fixed on the upper side of the web of the clamping yoke with the aid of clamping devices. The clamping devices are secured on the abutment or on the fixing projection of the axle housing. The clamping yoke is matched to the outer periphery of the axle housing of the commercial vehicle axle. The invention makes it possible to arrange a standardized clamping yoke on axle housings of different shapes and of differing diameters, allowing the clamping yoke to be used on axle housings with a hollow cross section, U sections or I sections. The items listed are given purely by way of illustration and are in no way intended to be exclusive. On the contrary, the clamping yoke according to the invention can be combined with any possible shape of axle housing. It is immaterial here whether the axle concerned is a live or a dead axle. The clamping yoke is advantageous since it can withstand high vertical forces and can fulfill other tasks, such as attachment of the longitudinal links, location of the shock dampers and attachment of the stabilizers. The invention makes it possible to arrange a very wide variety of spring elements on the axle housing. Examples which may be considered are leaf springs, coil springs, air springs or hydropneumatic spring systems in the form of hydraulic cylinders, for example. According to the invention, the web is at a distance from the axle housing in the installed condition.

In accordance with an additional embodiment of the invention, provision is made for an abutment, which spans the axle housing and at the same time connects the legs to one another, to be arranged on that side of the axle housing which faces away from the web, i.e., opposite from the web. The abutment provides additional anchoring for the clamping yoke on the axle housing. For this purpose, the abutment has lateral walls which extend at an angle to the base of the abutment and can be connected to the legs of the clamping yoke and/or to the web of the clamping yoke. To provide loss-proof connection between the abutment and the clamping yoke, the abutment and the clamping yoke can be screwed or clamped to one another. Other means of connection between the abutment and the clamping yoke are, of course, also possible.

At least one centering device is provided on the abutment and/or on the clamping yoke and/or on the fixing projection, allowing accurately positioned arrangement of the clamping yoke relative to the abutment or accurately positioned arrangement of the clamping yoke and/or of the abutment relative to the axle housing. It has furthermore proven advantageous to connect a spring element seated on the web of the clamping yoke not only to the clamping yoke but also to the abutment and to clamp the spring element thereto. This increases the strength of the assembled unit comprising the axle yoke and the spring element.

According to another embodiment of the invention, the fixing projection is arranged in the region of the neutral axis of the axle housing, i.e. arranged on the axle housing in the region of minimum bending. It is conceivable for the fixing projections to be secured on the axle housing horizontally or at an angle transversely to the driving direction. The fixing projections can be cast in one piece with the axle housing or, alternatively, can be welded to the axle housing.

In another embodiment of the invention, provision is furthermore made for a vertical force emanating from the spring element to be directed via the leg of the clamping yoke into the fixing projection of the axle housing. In this way, the spine of the axle housing is freed from the imposition of high vertical loads since the compressive load acting on the axle housing enters the axle housing homogeneously and laterally. Owing to the fact that the legs are connected to the fixing projections, the force of the spring element is not introduced directly from above into the spine of the axle housing. The spine of the axle housing is relieved of the vertical compressive load emanating from the spring element and this leads to a significant extension of the service life of the axle housing. The improvement in the introduction of vertical forces from the spring element into the axle housing makes it possible to use basic axle housing models which do not have to fulfill all functions, e.g. increased variability, yet have the required strength. The arrangement of fixing projections on axle housings with a trapezoidal cross section has proven particularly advantageous in this case. The width of the cross section of the axle housing increases from the top down. The vertical force emanating from the spring element flows via the legs of the clamping yoke into the fixing projections and, from there, into the wider lower region of the axle housing. In the case of axle housings made of cast iron, selective imposition of a compressive load in the spine of the axle housing and a tensile load in the lower region of the fixing projection is possible. The cast form and the trapezoidal cross section of the axle housing favor lateral introduction of vertical forces into the axle housing since the vertical forces can be introduced directly into the cast wall via the fixing projections.

Another conceivable way of optimizing the introduction of force into the axle housing is to make the fixing projection wedge-shaped, with the upper end of the fixing projection, that facing the web of the clamping yoke, forming a support surface for the leg, while the lower end of the fixing projection is tapered toward the wider, lower region of the axle housing.

In accordance with a concomitant feature of the invention, the underside of the leg and the profile of the fixing projection on which the leg rests are designed in such a way that mutual engagement between the underside of the leg and the fixing projection is possible. This ensures that the support profile can be secured on the fixing projection in a slip-proof manner.

Other features which are considered as characteristic for the invention are set forth in the appended claims.

Although the invention is illustrated and described herein as embodied in a device for attaching a spring element to a commercial vehicle axle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
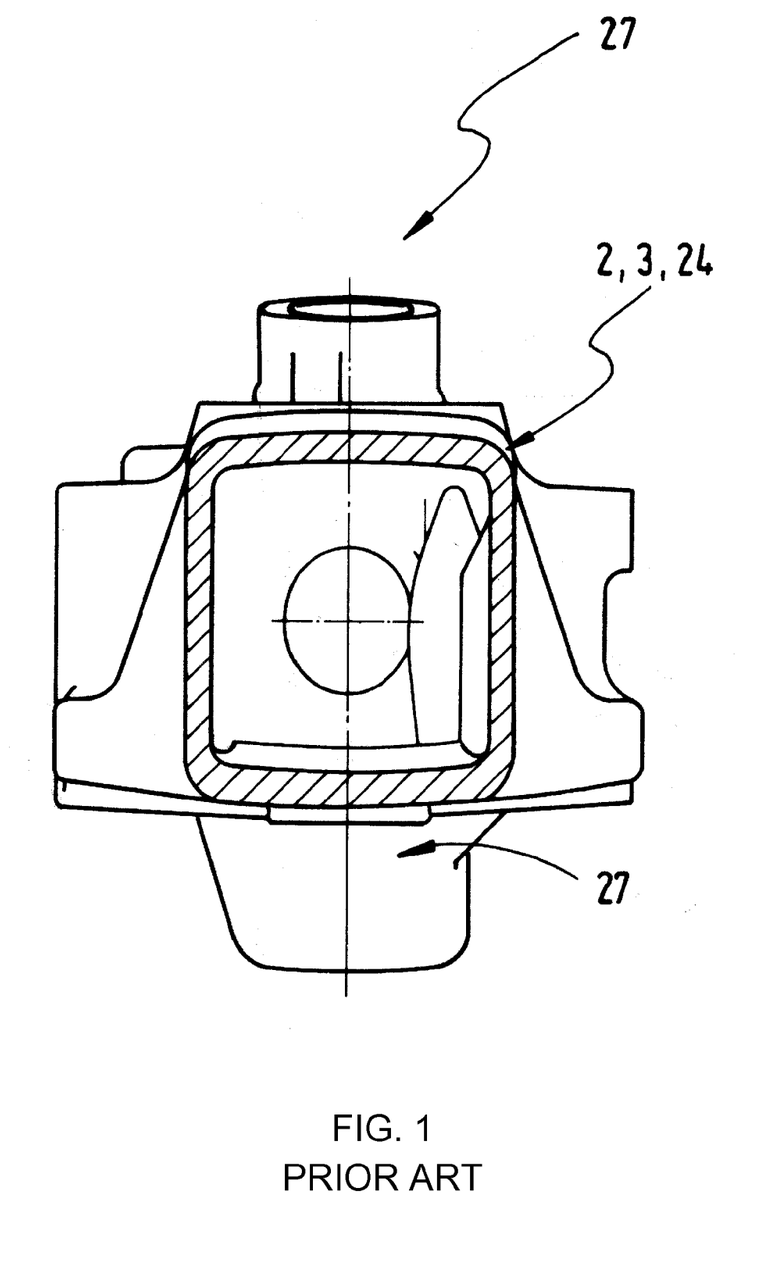
FIG. 1 shows an attachment device according to the prior art.
Figure 3:
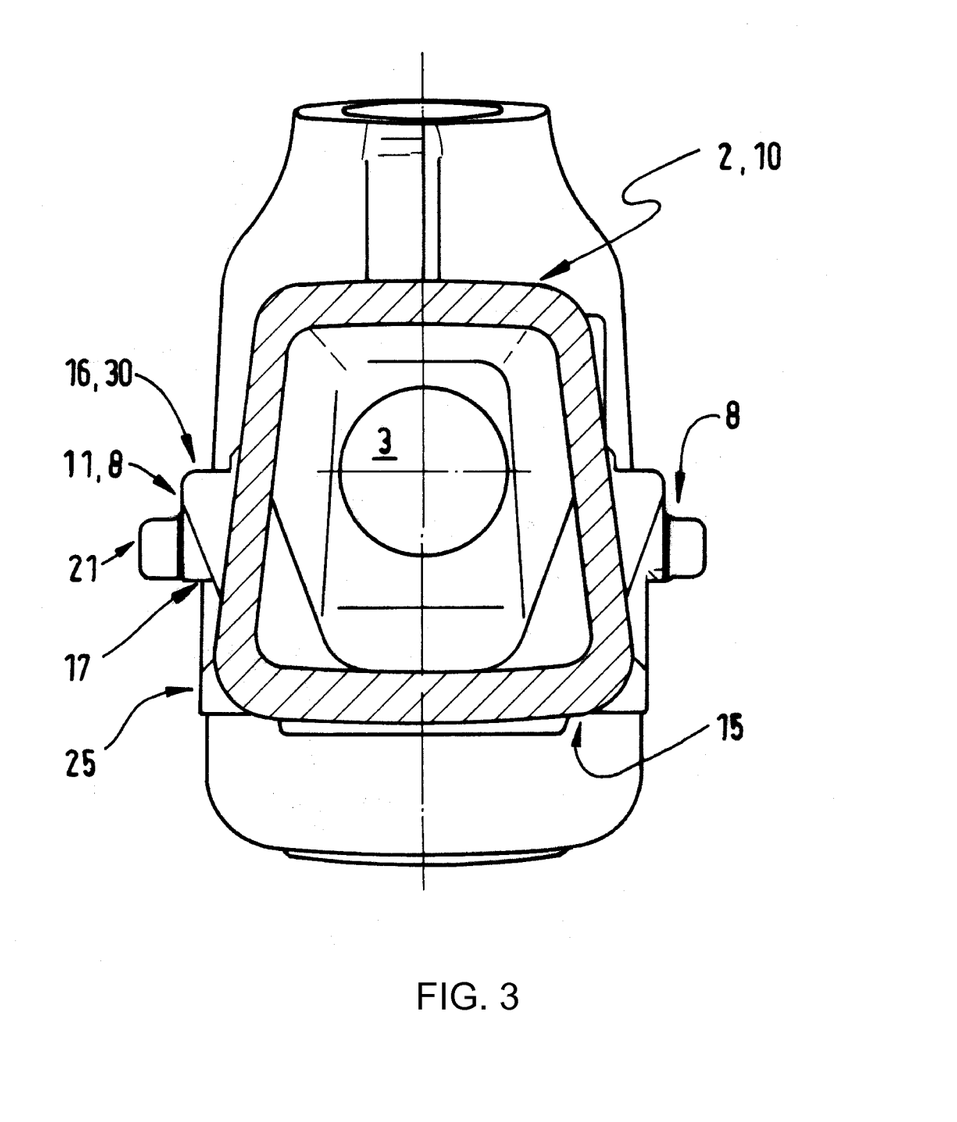
FIG. 3 shows a cross section through an attachment device on an axle housing.

Referring now to the figures of the drawing in detail and first, particularly, to FIG. 1 thereof, there is shown an attachment device for a spring element on an axle housing 2 of a commercial vehicle axle 3 for vibrationally decoupling the chassis frame of the vehicle from the vehicle axle 3 according to the prior art. In FIG. 3, the axle housing 2 has an approximately rectangular shape 24, which accommodates the vehicle axle 3. The number 27 indicates a receptacle for hub carriers.

Figure 2:
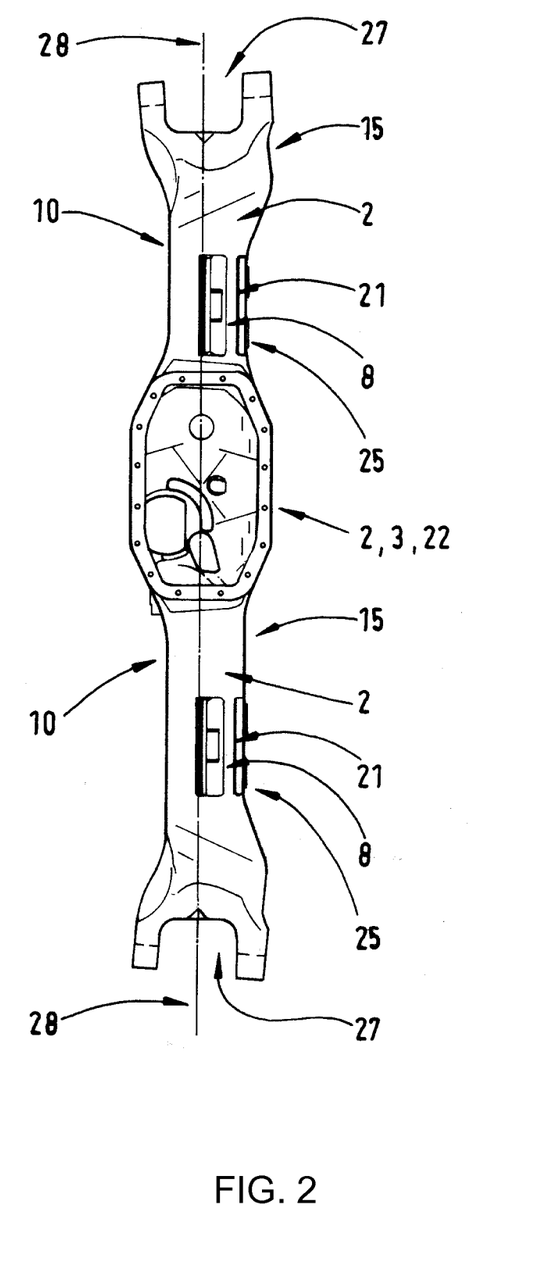
FIG. 2 shows an axle housing with the fixing projections according to the invention.

FIG. 2 shows, in side view, the axle housing 2 of the commercial vehicle axle 3 with the differential axle case 22 and the fixing projections 8. Provided on the fixing projections 8 and parallel to the fixing projections 8, on the axle housing 2, are centering devices 21, 25, which allow accurately positioned arrangement of the clamping yoke 4 and of the abutment 9 relative to one another and relative to the axle housing 2. Receptacles 27 for the hub carriers are provided at the two outer ends of the axle housing 2. Visible above the fixing projection 8 is the spine 10 of the axle housing 2, opposite which the lower region of the axle housing 2 is indicated by reference numeral 15. An imaginary line 28 runs along the fixing projection 8 and divides the axle housing 2 into a spine 10 and a lower region 15. The imaginary line 28 simultaneously marks the neutral axis 11, namely the region of the axle housing 2 in which bending is at a minimum.

FIG. 3 shows a section through the axle housing 2 near the clamping yoke 4 and the abutment 9 of the attachment device according to the invention. In FIG. 3, the axle housing 2 is of trapezoidal design and has a spine 10 and a lower region 15. When viewed in cross section, the axle housing 2 widens from the spine 10 toward the lower region 15. Visible within the axle housing 2 is the axle 3 of the commercial vehicle. Fixing projections 8 are attached in the axial direction on the outer periphery of the axle housing 2, approximately on the neutral axis 11 of the axle housing 2. The fixing projections 8 divide the axle housing 2 into a spine 10 and a lower region 15. At the upper end 16, the fixing projection has a support surface 30, on which the contact surface 18 of the leg 5 of the clamping yoke 4 (not shown) is supported. To optimize the vertical introduction of force 41 by the spring element 1 into the fixing projection 8 via the leg 5 of the clamping yoke 4, the fixing projection 8 tapers from the upper end 16 thereof toward the lower end 17 thereof, with the result that the force is introduced into the downward-widening region 15 of the axle housing 2. Centering devices 21 for accurately positioned arrangement of the clamping yoke 4 on the axle housing 2 are visible in FIG. 3. Arranged underneath the lower region 15 of the axle housing 2 is another centering device 25, which is used to position the abutment 9 relative to the axle housing 2.

Figure 4:
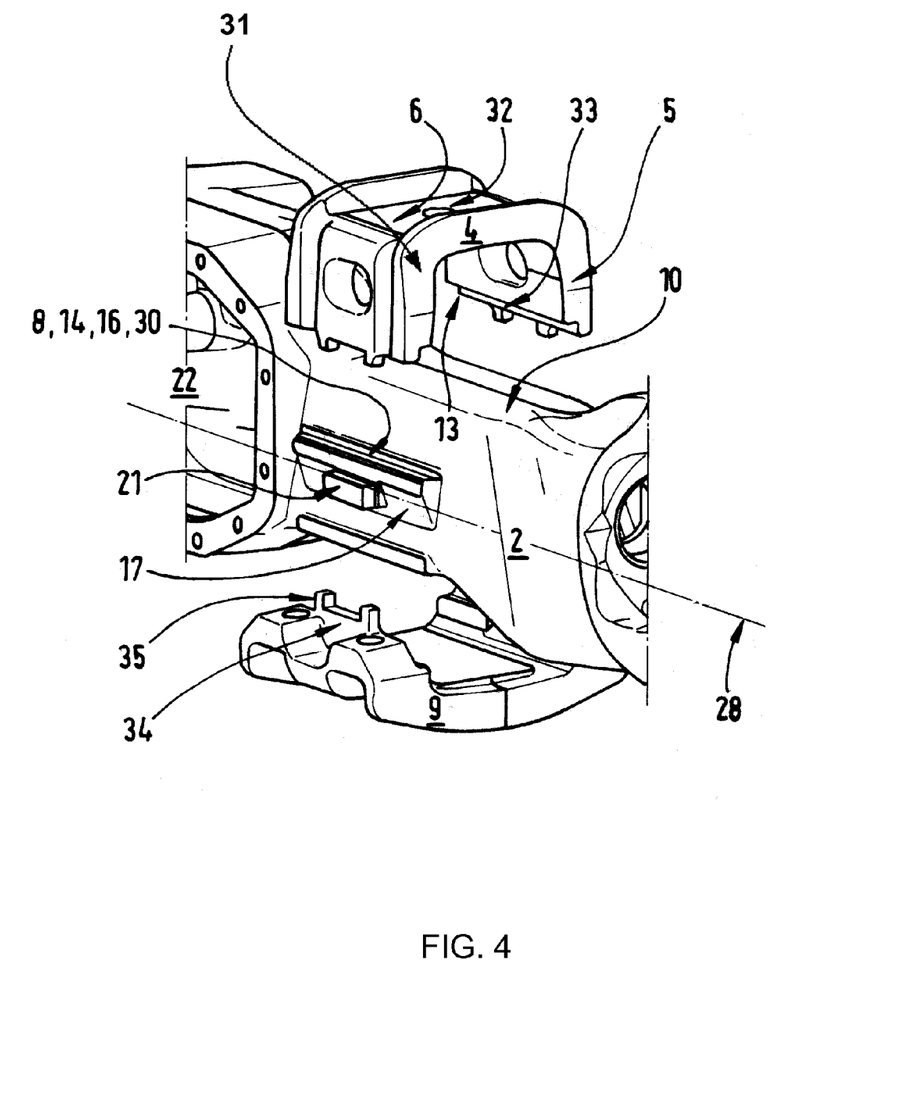
FIG. 4 shows an axle housing with fixing projections and the clamping yoke with abutment in an exploded view.

FIG. 4 shows, in an exploded view, an axle housing 2 with a clamping yoke 4 arranged over the spine 10 of the axle housing 2 and an abutment 9, which can be seen underneath the axle housing 2. In this arrangement, the axle housing 2 has a differential axle case 22 for the differential gear and, at its outer end, a receptacle 27 for the hub carrier. The fixing projection 8 extends along the imaginary line 28 on the outer periphery of the axle housing 2. The profile 14 of the fixing projection 8 exhibits an upper end 16, a downward-tapering lower end 17 and a centering device 21. FIG. 4 shows the legs 5 of the clamping yoke 4, between which the axle housing 2 extends. Extending between the legs 5 of the clamping yoke 4 to connect the legs to one another is the web 6, which has a locating device 32 for a spring element 1 (not shown). Contact surfaces to enable the legs 5 to rest on the support surfaces 30 of the fixing projections 8 can be seen on the undersides 13 of the legs 5. Likewise illustrated on the undersides 13 of the legs are studs 33, which are used to position the legs 5 of the clamping yoke 4 on the centering device 21 of the fixing projection 8. Contact surfaces 34 are arranged on the abutment 9 to enable the abutment 9 to rest against the axle housing 2. The abutment 9 is centered relative to the centering device 21 of the fixing projection 8 by means of studs 35 on the abutment 9. Screws (not shown) are provided to enable the clamping yoke 4 to be secured in a loss-proof manner on the abutment 9. However, it is also conceivable to secure the clamping yoke 4 to the abutment 9 in a loss-proof manner by means of different connecting means. One conceivable example is to connect the legs 5 of the clamping yoke 4 to the abutment 9 by means of a hinge on one side of the axle housing and to connect the remaining, free legs 5 to the free end of the abutment 9 by means of a screw coupling or some other connection device.

Figure 5:
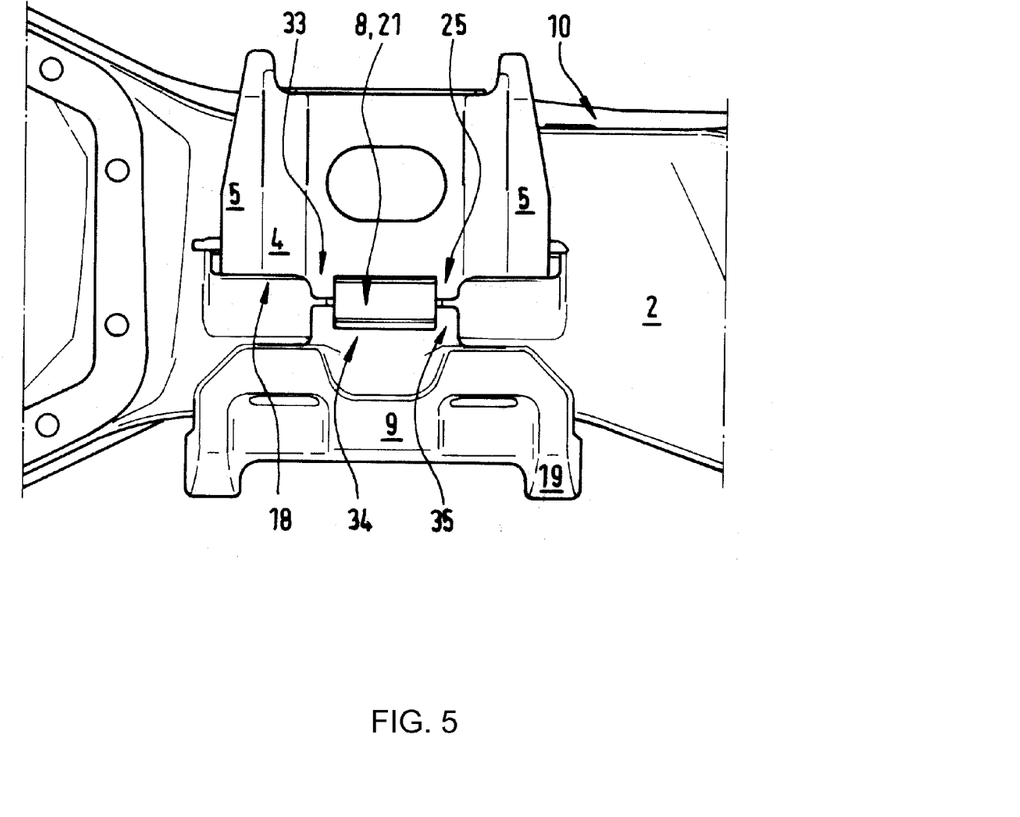
FIG. 5 shows an axle housing with an attachment device in side view.

FIG. 5 shows the axle housing 2 in side view with the attachment device according to the invention in the installed condition 40. The attachment device has a clamping yoke 4 and an abutment 9 connected to the clamping yoke 4. From the side view, it is possible to see the leg 5 of the clamping yoke 4, which rests by the contact surface 18 thereof on the fixing projection 8. At the same time, the clamping yoke 4 is aligned on the centering device 21 of the fixing projection 8 by means of the studs 33. Opposite the spine 10 of the axle housing 2 there is to be seen the abutment 9, the lateral walls 19 of which carry studs 35, by means of which the abutment 9 is centered on the fixing projection 8. Here, the abutment 9 rests by the contact surfaces 34 thereof against the centering device 25 of the axle housing 2, the centering device facing away from the spine 10 of the axle housing 2.

Figure 6:
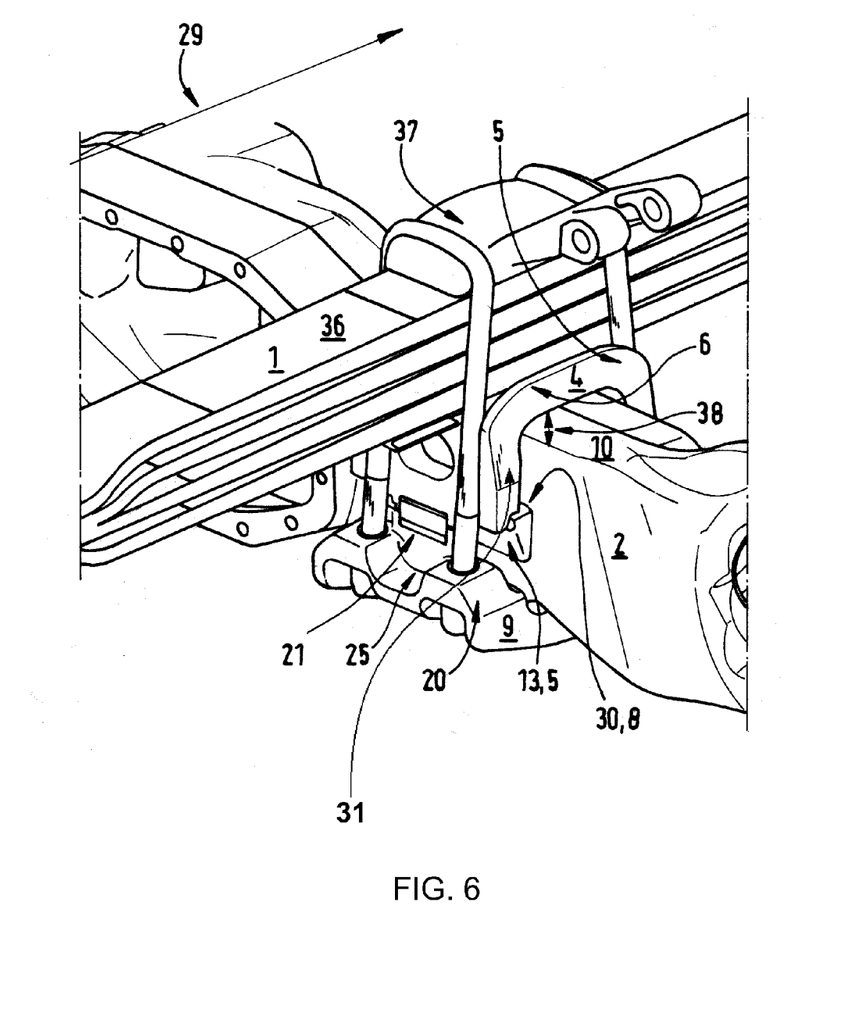
FIG. 6 shows the attachment device according to the invention in the installed condition, with a leaf spring system.

FIG. 6 shows, in an overall perspective view the attachment device according to the invention for a spring element 1 on an axle housing 2 of a commercial vehicle axle 3. Here, the clamping yoke 4 and the abutment 9 are arranged ready for use on the axle housing 2. Resting on the upper side of the web 6 is a leaf spring pack 36, which is positioned on the web 6 by means of clamps 37, which are secured on the abutment 9. FIG. 6 illustrates that the clamping yoke 4 is seated by way of the underside 13 of the legs 5 thereof on the support surfaces 30 of the fixing projections 8. In a manner comparable with the previous figures, the clamping yoke 4 is aligned on the axle housing by means of the centering device 21. In a manner likewise comparable with the previous figures, the abutment 9 shown in FIG. 6 is arranged in an accurately positioned manner by the base 20 thereof on the centering device 25 of the axle housing 2. In FIG. 6, the axle housing 2 extends transversely to the driving direction 29. The spring element 1 in the form of a leaf spring pack 36 extends approximately at right angles to the axle housing 2 in the driving direction 29. Owing to the positioning of the clamping yoke 4 on the support surfaces 30 of the fixing projections 8, the legs 5 of the clamping yoke 4 rise above the axle housing 2 of the commercial vehicle axle 3, with the result that the web 6 of the axle housing 2 is disposed at a spacing distance 38 from the spine 10 of the axle housing 2.

Figure 7:
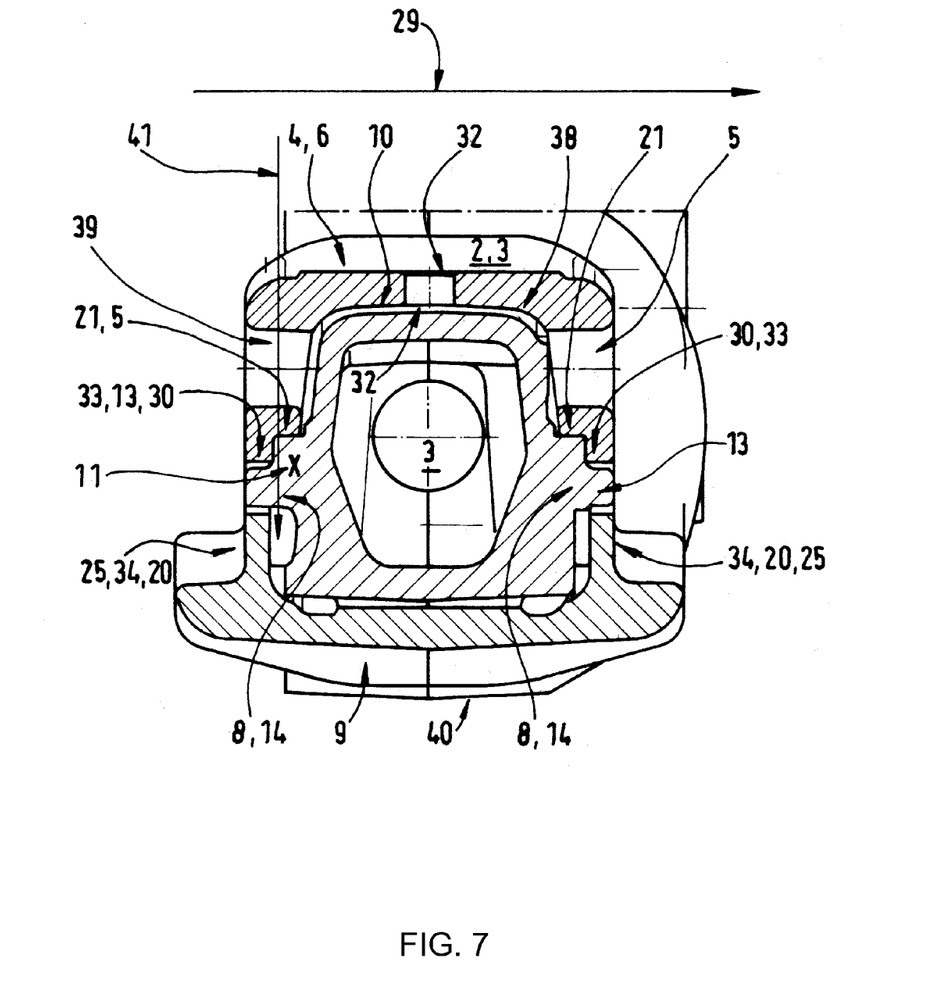
FIG. 7 shows a section corresponding to FIG. 3 through an attachment device on an axle housing.

FIG. 7 shows a section in the driving direction 29 through the axle housing 2 of the commercial vehicle axle 3 in the region of the means according to the invention for attaching the spring element 1 (not shown). The vehicle axle 3 extends within the axle housing 2. The fixing projections 8 are shown in the region of the neutral axis 11 of the axle housing 2. The fixing projections 8 project on both sides from the axle housing 2 of the commercial vehicle axle 3 in the driving direction 29, at the level of the neutral axis 11 of the axle housing 2. The profile illustration 14 of the fixing projections 8 shows the support surfaces 30 of the fixing projections 8 and the centering device 21. The legs 5 of the clamping yoke 4 rest on the support surfaces 30 of the fixing projections 8 by the respective underside 13 of the leg. To center the legs 5 of the clamping yoke 4 relative to the centering device 21 of the fixing projection 8, the studs 33 of the legs 5 are provided. Formed on the side of the axle housing 2 remote from the spine 10 of the axle housing 2 is the abutment 9, which rests by the contact surfaces 34 thereof on the base 20 against the axle housing 2. Here, the centering devices 25 are used for the accurately positioned alignment of the abutment 9 relative to the axle housing 2. In FIG. 7, the clamping yoke 4 with the legs 5 thereof is shown above the spine 10 of the axle housing 2. A hole 39, which extends in the driving direction 29, is provided in the legs 5 of the clamping yoke 4 in order to reduce the weight. According to the invention, the web 6 of the clamping yoke 4 is at a distance 38 from the spine 10 of the axle housing 2 in the installed condition 40. It is apparent from this that the introduction of force 41 by the spring element 1 (not shown) via the locating device 32 of the web 6 does not take place directly and vertically into the spine 10 of the axle housing 2 but into the fixing projections 8 of the axle housing 2 via the legs 5 of the clamping yoke 4 in the region of the neutral axis 11. The distance 38 between the web 6 of the clamping yoke 4 and the spine 10 of the axle housing 2 is visible in FIG. 7.

Figure 8:
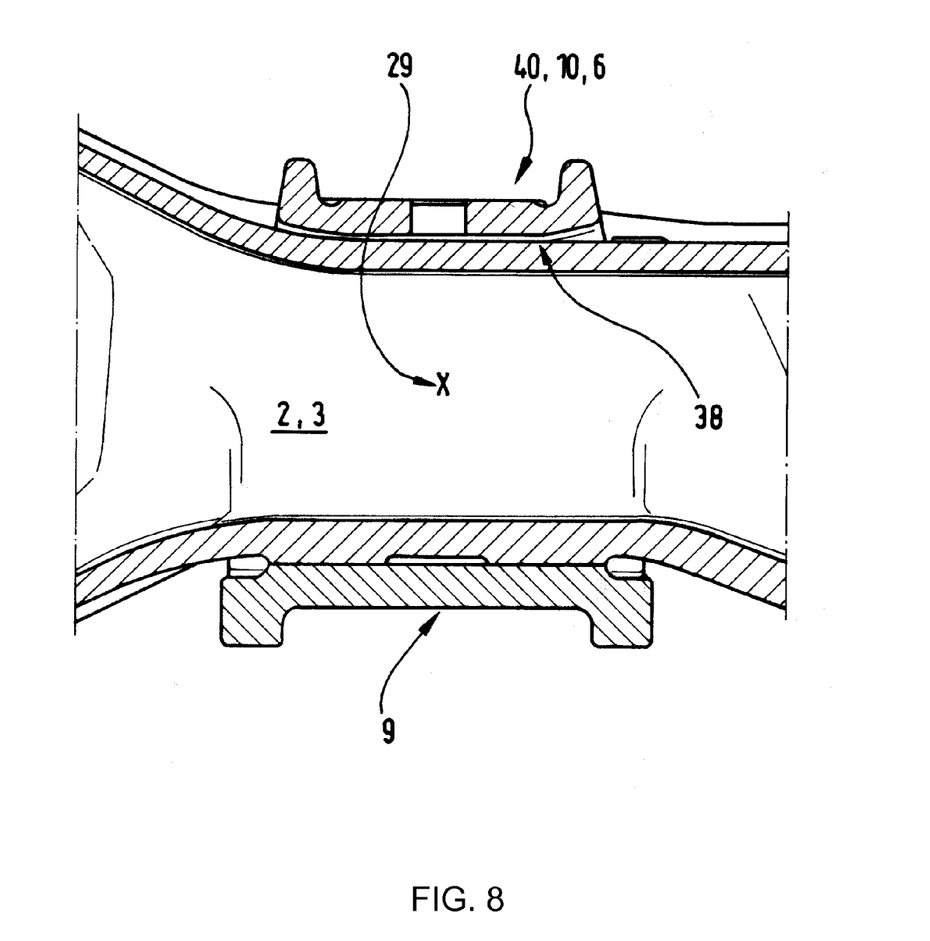
FIG. 8 shows a longitudinal section through an axle housing in the region of attachment of the spring element.

FIG. 8 shows a portion of a longitudinal section, transversely to the driving direction 29 through the axle housing 2, in which the attachment device according to the invention for the spring element 1 (not shown) is shown in the installed condition 40. FIG. 8 shows the abutment 9 on the side of the commercial vehicle axle 3 facing away from the spine 10 of the axle housing 2, and also shows the web 6 of the clamping yoke 4 with the distance 38 thereof from the spine 10 of the axle housing 2.

The invention claimed is:

1. A commercial vehicle, comprising:
   an axle housing supported on a chassis frame by way of spring elements, said axle housing having a front and a rear relative to a driving direction of the vehicle, a longitudinal side, and an upper side;
   said axle housing having a fixing projection formed on a longitudinal side thereof;
   a clamping yoke connecting each of said spring elements, said clamping yoke having two legs and a web connecting said two legs to one another, one of said legs resting against the front of said axle housing and another of said legs resting against the rear of said axle housing;
   each of said two legs being fixed on and secured to a respective said fixing projection on said axle housing, and said web being spaced apart from the upper side of said axle housing, said fixing projection having an upper support surface for said leg and tapering downward toward said axle housing; and wherein a vertical force emanating from a respective spring element is directed via said leg into said fixing projection of said axle housing.

2. The commercial vehicle according to claim 1, which comprises an abutment spanning said axle housing and connecting said legs to one another opposite from, and on a side of said axle housing facing away from said web.

3. The commercial vehicle according to claim 2, wherein said abutment includes at least one centering device.

4. The commercial vehicle according to claim 1, wherein said fixing projection is disposed in a region of a neutral axis of said axle housing.

5. The commercial vehicle according to claim 1, which comprises at least one centering device on said fixing projection.

6. The commercial vehicle according to claim 1, wherein a contour of an underside of said leg and a profile of said fixing projection correspond to one another.

7. The commercial vehicle according to claim 1, wherein said clamping yoke includes at least one centering device.

8. In a commercial vehicle, an assembly for connecting an axle housing with a spring element, the axle housing having a front and a rear relative to a driving direction of the vehicle, front and rear longitudinal sides, and an upper side, the assembly comprising:

a clamping yoke for connecting the spring element to the axle housing, said clamping yoke having two legs and a web connecting said two legs to one another, one of said legs resting against the front of the axle housing and another of said legs resting against the rear of the axle housing;

a fixing projection formed on each of the front and rear longitudinal sides of the axle housing, said fixing projection having an upper support surface for a respective said leg and tapering downward toward the axle housing;

each of said two legs being fixed on and secured to a respective said fixing projection on the axle housing, and said web being spaced apart from the upper side of the axle housing; and wherein a vertical force emanating from a respective spring element is directed via said leg into said fixing projection of said axle housing.

9. The assembly according to claim 8, which comprises an abutment spanning said axle housing and connecting said legs to one another opposite from, and on a side of the axle housing facing away from said web.

10. The assembly according to claim 9, wherein said abutment includes at least one centering device.

11. The assembly according to claim 8, which comprises at least one centering device on said fixing projection.

12. The assembly according to claim 8, wherein a contour of an underside of said leg and a profile of said fixing projection correspond to one another.

13. The assembly according to claim 8, wherein said clamping yoke includes at least one centering device.

* * * * *